United States Patent [19]

Smith

[11] 4,204,407
[45] May 27, 1980

[54] HEATED PIPING SYSTEM FOR FUSIBLE SALT HEAT EXCHANGE FLUID IN A SOLAR POWER PLANT

[76] Inventor: Otto J. M. Smith, 612 Euclid Ave., Berkeley, Calif. 94708

[21] Appl. No.: 916,462

[22] Filed: Jun. 16, 1978

[51] Int. Cl.$^2$ ............................................. F03G 7/02
[52] U.S. Cl. ..................................... 60/641; 126/427; 126/900; 165/134 R; 137/341; 219/300
[58] Field of Search ........................... 165/104 M, 134; 126/271, 900, 427; 219/300; 60/641; 137/341

[56] References Cited
U.S. PATENT DOCUMENTS

| | | | |
|---|---|---|---|
| 1,019,413 | 3/1912 | Batchelder | 219/300 X |
| 2,981,818 | 4/1961 | Trabilcy | 219/300 |
| 3,258,204 | 6/1966 | Smith, Jr. | 165/104 M X |

Primary Examiner—Albert W. Davis

Attorney, Agent, or Firm—Flehr, Hohbach, Test, Albritton & Herbert

[57] ABSTRACT

The method of heating the piping system for a HITEC or PARTHERM 290 (trademarks) heat exchange flow system in which this fusible salt is used as the heat exchange fluid throughout a solar electric power plant field. To prevent the fusible salt from freezing in the stainless steel pipes and to heat up the pipes prior to introduction of the molten salt the entire piping system in the field is heated up above the melting temperature of the salt. That is, they are heated to a temperature somewhere above 150° C. and below 500° C. For this purpose, a high current at a very low voltage flows through the piping system and uses the stainless steel pipes themselves as the resistive heating element and dissipates energy within the stainless steel pipes bringing them up to an appropriate temperature.

2 Claims, 3 Drawing Figures

PIPING DETAIL OF 4 BRANCHES OF 2 TOWERS PER BRANCH

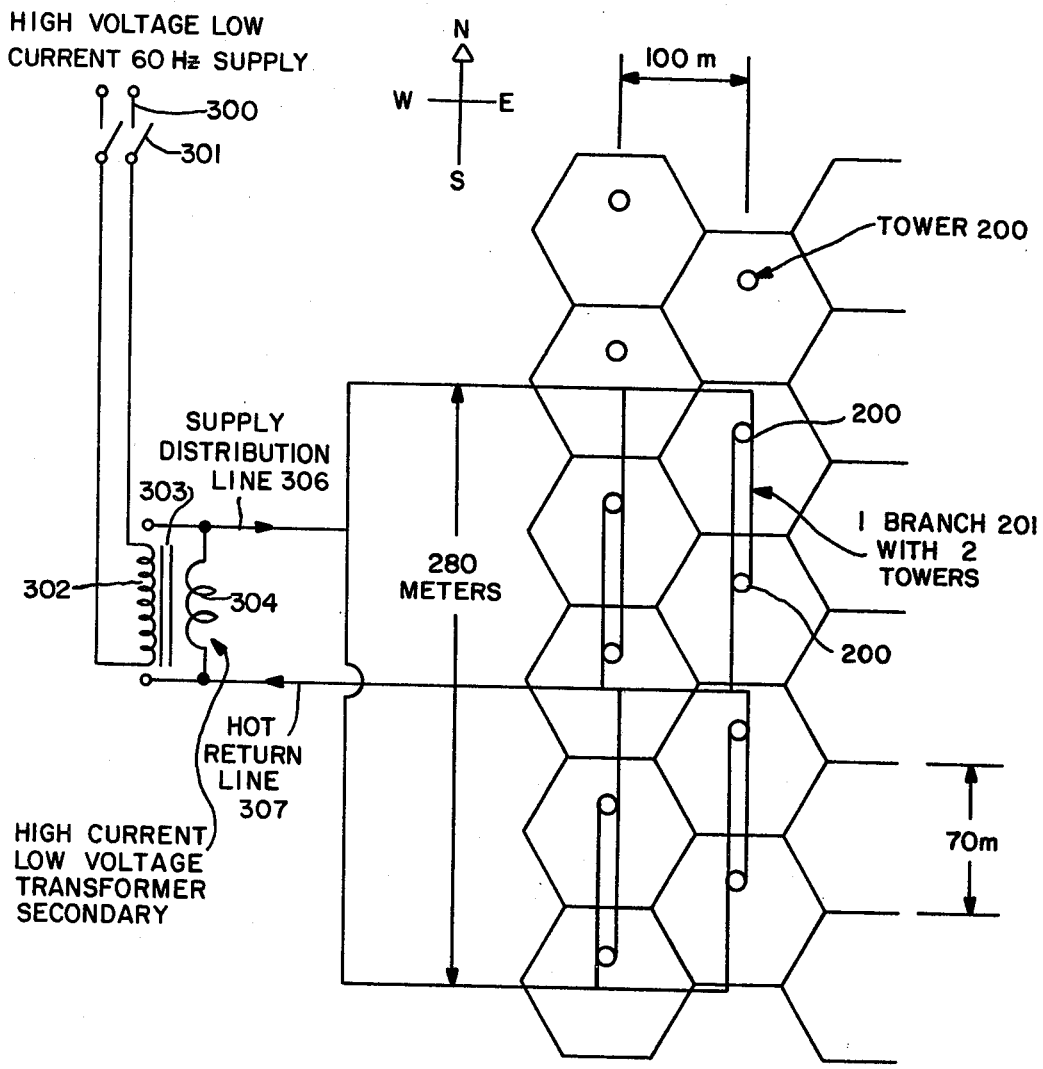
PIPING DETAIL OF 4 BRANCHES OF 2 TOWERS PER BRANCH
FIG.—1
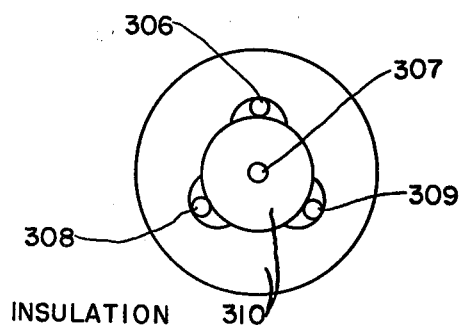
FIG.—2

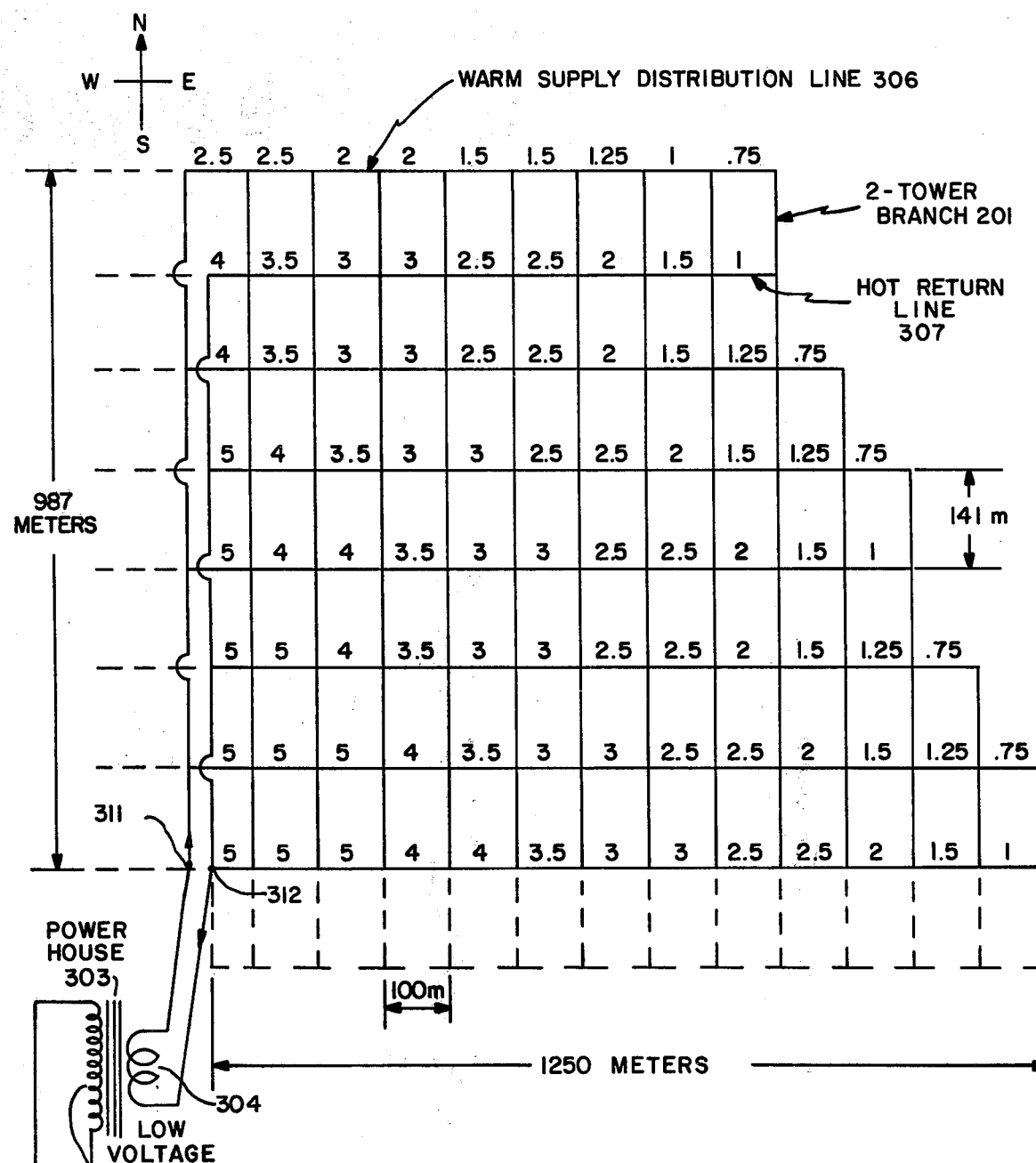
FIG.—3
PIPING SYSTEM FOR NORTH-EAST QUARTER OF A 600-MODULE SOLAR THERMAL ELECTRIC PLANT
ALL BRANCHES HAVE 0.75" PIPE
PIPE SIZES FOR DISTRIBUTION LINES ARE SHOWN IN INCHES

HEATED PIPING SYSTEM FOR FUSIBLE SALT HEAT EXCHANGE FLUID IN A SOLAR POWER PLANT

BACKGROUND OF THE INVENTION

The present invention is directed to a heated piping system for a fusible salt heat exchange fluid in a solar power plant.

In conventional power plants exposed to severe cold, fluid carrying pipes have strapped on them high resistance conductors "tracing" the pipes to maintain the fluid within molten. However, this tracing is within the confines of the power house and very expensive.

In a solar energy system having miles of piping the above would be wholly impractical.

OBJECT AND SUMMARY OF THE INVENTION

It is, therefore, an object of the present invention to provide an improved technique for heating the piping system of a power plant.

Accordingly, there is provided a solar electric power plant having a plurality of solar heat receptors and using as a heat exchange fluid a material which is a solid at normal ambient temperatures. A piping system interconnects the heat receptors having discrete supply and return lines for carrying the material and are electrically insulated from one another. The piping is electrically conductive having a relatively low resistance. A power source is provided for impressing a low voltage across the supply and return lines for causing the resistance of the piping to provide an ambient temperature above the melting point of the material.

BRIEF DESCRIPTION OF THE DRAWINGS

FIG. 1 is a simplified diagram of a modular field of solar receptors along with an electrical schematic embodying the present invention;

FIG. 2 is a cross-sectional view of typical piping; and

FIG. 3 is a layout diagram based on FIG. 1.

DETAILED DESCRIPTION OF THE PREFERRED EMBODIMENT

In FIG. 1 there is shown the outlines of the modular fields of solar receptors as disclosed in the copending applications, Ser. Nos. 737,489 and 717,641, filed Nov. 1, 1976, and Aug. 25, 1976, respectively, and now U.S. Pat. Nos. 4,117,682 and 4,164,123 and these outlines are hexagonal in shape. The hexagons are actually somewhat elongated as shown in the copending applications. Approximately in the center of each of these hexagonal fields is a tower 200 with a heat receptor (not shown) and this tower is supplied by a pipe which delivers molten HITECH (trademark), a fusible salt, to the tower at intermediate temperatures and a second pipe which receives the heated HITEC from the tower 200 at a very high temperature. The second pipe is called the hot return line 307 and the first pipe is called the supply distribution line 306. Another suitable material is PARTHERM 290 (trademark).

In FIG. 1 each branch 201 has two towers 200 in parallel such that some of the material will flow through one tower and some will flow through a secondary tower. A high voltage low current 60 Hz power supply 300, which can be 120 volts is provided. The switch 301 permits the energization of the primary winding 302 of a step down transformer 303 which has a very high current very low voltage winding 304. The terminals of the winding 304 are connected respectively to the hot return line 307 and to the supply distribution line 306. The high current produced by winding 304 therefore enters the supply distribution line 306 and flows through the stainless steel of which this line is constructed, flows up through the stainless steel piping into the tower, flows through the heat receptor piping array within the tower, flows down again through the second piping system and eventually comes back through the hot return line 307. It can be seen, therefore, that the route of the electrical current flow through the stainless steel piping system corresponds closely with the route of molten material under normal operation flowing through the centers of the same piping system. Throughout the entire piping system, therefore, the current that flows through the stainless steel walls of the pipes will produce a heating effect proportional to the square of the current and proportional to the resistance per foot of pipe.

FIG. 2 shows a typical tubing cross-section with insulation. This tubing shows four pipes, 306, 307, 308 and 309. The two pipes 306, 307 are the molten material pipes and they are surrounded by thermal insulation 310 to prevent loss of heat from these pipes by the environment. Pipe 306, as discussed above, is the supply distribution line and pipe 307 the hot return line. Pipe pair 308,309 are for a second heat transfer fluid as disclosed in the above referenced U.S. Pat. No. 4,117,682 in FIGS. 6 and 9; specifically the triethylene glycol lines in FIG. 6 designated 140° C. TEG and 200° C. TEG, and in FIG. 9, TEG input lines 221 and exit line 222. Thermal insulation is also relatively good electrical insulation so that there is very little opportunity for the high electrical current passing through this piping system to find a route to return to the transformer by any route other than the designed and intended route of flowing back through the piping system. Because of the high thermal insulation around both portions of the piping system heat energy put into the piping system is not dissipated to the environment and the piping system can rise to a very high temperature under the influence of a small wattage for a long time or a higher wattage for a shorter time.

The magnitude of current chosen for the low voltage high current secondary 304 is selected such that this magnitude of current flowing through the piping system will bring every part of the stainless steel piping system to a temperature above 200° C. after approximately three hours of operation. This permits the piping system to be brought up to a high temperature prior to the introduction of molten material into the piping system when it is first charged. It also permits the piping system to be heated with the electrical heat tracing in the event that due to an accident the material has been permitted to freeze up in the piping system.

FIG. 3 shows the piping system for one fourth of a 100 megawatt electrical power plant consisting of 600 modules and 600 towers. In the figure shown, the branches for 150 of the towers have been drawn. These 150 towers have 75 branches. Each branch is a vertical line in FIG. 3. The horizontal lines are the supply distribution and the hot return lines for this large power plant and correspond to the same named lines in FIG. 1. At the power house all of the supply distribution lines come to a single point 311 and all of the hot return lines come to a single point 312. In FIG. 3 there is shown the high voltage supply 300 for a step down transformer 303 which has a secondary winding 304, one terminal of which is connected at the junction 311 between the electrical system and the supply distribution line 306 and the other terminal of which is connected at the junction 312 between the electrical system and the hot return line 307. In this figure, therefore, it can be seen that the current provided by the transformer will flow through all of the piping system and through all of the towers in parallel.

Thus an improved technique for heating the piping system of a solar power plant has been provided.

What is claimed is:

1. In a solar electric power plant having a plurality of solar heat receptors using as a heat exchange fluid a material which is a solid at normal ambient temperatures the invention comprising: a piping system interconnecting said heat receptors having discrete supply and return lines for carrying said material and which are electrically insulated from one another said piping being electrically conductive having a relatively low resistance; and a power source for impressing a low voltage across said supply and return lines for causing the resistance of said piping to provide an ambient temperature above the melting point of said material.

2. A power plant as in claim 1 where said supply and return lines are thermally insulated from one another such insulation concommitantly providing electrical insulation.

* * * * *